Patented July 9, 1940

2,207,145

UNITED STATES PATENT OFFICE 2,207,145

METHOD OF ACTIVATING NATURAL EARTHS

Richard Doht, Bratislava, Czechoslovakia, assignor, by mesne assignments, to Aktiengesellschaft Dynamit Nobel, Pressburg, Slovakia, a company No Drawing. Application February 17, 1937, Serial No. 126,311. In Austria February 22, 1936

6 Claims. (Cl. 252—2)

This invention relates to a method of activating natural earths according to which the activation is effected with the aid of sulphuric acid, while the gypsum which is evolved by the treatment with sulphuric acid, and which is detrimental to the activity of the activated earths, is nevertheless partly or completely eliminated.

It is a known fact that clay and the like crude earths capable of activation can be activated at ordinary or elevated temperature and under ordinary or increased pressure, with the aid of mineral acids. The employment of sulphuric acid as activating agent is attended, however, by the drawback that, to the extent that there are convertible calcium compounds present in the earth, gypsum becomes formed which remains as an insoluble concomitant in the final product, and which greatly depreciates the value of the final product. In accordance with the present invention it has become possible to dissolve the gypsum evolved in the course of the activating process and also the gypsum originally present in the crude earth under treatment, and to render the same capable of being washed out.

The invention consists essentially in treating earths with sulphuric acid and hydrochloric acid at ordinary or elevated temperatures and/or pressures. The hydrochloric acid is employed at such a time and in such quantity that the gypsum evolved and any gypsum present from the outset is dissolved and retained in solution, so that it can be washed out.

It is a known fact that, as a result of decomposing treatment with acids, the silica present in crude earths is converted into silicic acid. In accordance with the invention crude earths are treated with so much sulphuric acid that, in addition to the conversion of the silica present into silicic acid, as far as possible the whole of the decomposable calcium present is converted into gypsum.

Along with sulphuric acid there may also be employed instead of hydrochloric acid, hydrogen chloride, sodium chloride, or other alkali chloride. The addition of the sulphuric acid and of the hydrochloric acid, or hydrogen chloride, or alkali chloride, may be effected simultaneously, or, as described later on, separately.

If the acids are to be used as such they may also be added in commixture. When sulphuric acid and for example sodium chloride are simultaneously present the sodium chloride is decomposed with the formation of hydrogen chloride and acid or neutral sodium sulphate. When working according to the last-mentioned method care must be taken to ensure that sulphuric acid and sodium chloride are introduced into the process in sufficiently large quantities, so that the sulphuric acid effects the activation and the conversion of as far as possible the whole of the decomposable calcium into gypsum, and so that sulphuric acid and sodium chloride react to form sufficient hydrochloric acid to dissolve and retain in solution the gypsum evolved in the course of the treatment together with any gypsum present in the earth from the outset.

As already indicated, the novel method according to the invention may also be carried out in such a manner that crude earth is treated with sulphuric acid, while, independently of this treatment, there is carried out the treatment with hydrochloric acid, or hydrogen chloride, or sulphuric acid and a suitable alkali chloride. It may also prove advisable first to separate crude earths treated with sulphuric acid alone from the liquid phase, and also thereafter to pass the same on to the further treatment. The sulphuric acid to be added first is employed in such quantity that it is capable of effecting activation and the complete conversion of the calcium present into gypsum; the subsequent addition of hydrochloric acid, or of hydrogen chloride, or of sulphuric acid and alkali chloride is in such an amount that the whole of the gypsum present is dissolved and retained in solution.

Examples (1) A quantity of natural earth corresponding to 100 parts of dry matter is stirred up with water to form a sludge weighing 1.2 to 1.4 kgs. per litre, and to this there is added approximately 70 parts of water. To the sludge there are added, under constant stirring, 36 parts of sulphuric acid 78% strong and 50 parts of hydrochloric acid (20° Bé.). The addition of hydrochloric acid may be given in the cold or equally in the heat, at a temperature of 60–100° C. After the addition of the hydrochloric acid the mixture is brought to the boil by the direct introduction of steam. If stronger or weaker acids be used the quantity thereof is appropriately reduced or increased, respectively.

(2) A quantity of crude earth corresponding to 100 parts of dry matter is stirred up with water to form a sludge weighing 1.2 to 1.4 kgs. per litre, and to this there is added approximately 150 parts of water. To the sludge there are added, under constant stirring, 73 parts of sulphuric acid 78% strong and 45 parts of sodium chloride. The sodium chloride may be added either in the cold or in the heat at a temperature of 60–100° C. After the sodium chloride has been added the mixture is brought to the boil by the direct introduction of steam. If stronger or weaker sulphuric acid be used the quantity thereof is approximately reduced or increased, respectively.

(3) A quantity of crude earth corresponding to 100 parts of dry matter is stirred up with water, as given in Example 2, to form a sludge weighing 1.2 to 1.4 kgs. per litre, and diluted with 150 parts of water. There is then added to the sludge, under stirring, 45 parts of sodium chloride, after which the mixture is heated to about 60° C. or to a still higher temperature (up to 100° C.) by the direct introduction of live steam. Finally, there is added, under stirring, 73 parts of sulphuric acid of 78% strength, or if stronger or weaker acid be employed an appropriately smaller or larger amount thereof. The introduction of steam is continued until the mixture boils vigorously.

The reaction mixture obtained in accordance with Examples 1 to 3 is subjected to filtration, washing, drying, and grinding in a known manner.

(4) A quantity of crude earth corresponding to 100 parts of dry matter is stirred up with water to form a sludge weighing 1.2 to 1.4 kgs. per litre, and to this there is then added at ordinary temperature, and under constant stirring, approximately 100 parts of water and 50 parts of sulphuric acid 92% strong, after which live steam is introduced directly into the mixture until it boils vigorously. The water and sulphuric acid may also be added at temperatures up to 60° C. After the mixture has been left to stand in the heat for some considerable length of time the liquid phase is drawn off, and the pasty residue treated, under stirring and heating up to 100° C., with approximately 80 parts of concentrated hydrochloric acid or the quantity of hydrogen chloride gas corresponding to this amount of hydrochloric acid. This treatment is then followed by filtration, washing, drying, and grinding.

(5) The reaction mixture obtained according to Example 4 after the addition of water and sulphuric acid, after having been boiled with the aid of steam, and after separation of the liquid phase following a prolonged period of standing, is heated under stirring, by the introduction of steam, with 150 parts of water, 45 parts of sodium chloride, and approximately 50 parts of sulphuric acid 78% strong, up to boiling. After having been left to stand for a considerable length of time in the heat, the reaction product is filtered, washed, dried, and ground.

The product obtained in accordance with each of the above five examples has been found to be active earth of excellent bleaching power.

All of the examples given relate to crude earths of approximately the following composition:

|  | Per cent |
|---|---|
| $SiO_2$ | 58.05 |
| $Al_2O_3$ | 21.82 |
| $Fe_2O_3$ | 3.18 |
| CaO | 2.86 |
| MgO | 4.21 |
| Loss in calcination | 10.05 |

If crude earths of a composition differing widely from that given above the agents are used in appropriately modified quantities.

I have found that it is advisable, in practising the described method, to employ acid in excess. If acid is not used in excess basic sulphates are apt to become evolved during the washing of the reaction product, and these sulphates precipitate out, contaminate the final product, and reduce its activity. The formation of basic sulphates is effectually inhibited by the employment of acid excess.

I have found the form of method to be particularly advantageous in which a suitable alkali chloride is employed in the presence of sulphuric acid; by the use of an alkali chloride along with sulphuric acid the specific gravity of the mother liquor is increased, with the result that the material to be activated or already activated is retained in suspension and brought into intimate contact with the activating acid, while as a further consequence better results are obtained as regards activation.

I claim:

1. The method of activating crude earth, which consists in slurrying unbaked crude earth with water to form a sludge weighing substantially 1.2–1.4 kilograms per liter, adding water to the said sludge to obtain a concentration favourable for activation, adding cold dilute sulphuric acid while stirring, heating likewise while stirring to a temperature of at the most about 200° C., and then bringing hydrochloric acid in any desired or convenient form into contact with the resulting reaction mixture, heating to a temperature of at the most about 200° C., and washing with water, the quantity of hydrochloric acid being such that gypsum present in the starting materials and gypsum evolved by the treatment with sulphuric acid is thereby dissolved and retained in solution during the said subsequent washing, said washing being continued until the gypsum is completely removed.

2. The method of activating crude earth, which consists in slurrying unbaked crude earth to form a sludge weighing substantially 1.2–1.4 kilograms per liter, adding further water to establish a concentration favorable for activation, adding in the cold and while stirring dilute sulphuric acid and dilute hydrochloric acid in any desired form, heating and then water washing, the quantity of sulphuric acid employed being such that activation is effected, and the quantity of hydrochloric acid employed being such that gypsum present in the starting materials and gypsum evolved in the course of the treatment with sulphuric acid is dissolved and retained in solution during the said subsequent washing step, after which the resulting mixture is heated to a temperature of at the most about 200° C. and finally the whole of the gypsum washed out.

3. A method as claimed in claim 1, in which for a quantity of crude earth corresponding to 100 parts of dry matter there is employed so much sulphuric acid that the sulphuric acid corresponds to approximately 36 parts of sulphuric acid 78% strong, after which there is added to the product treated with sulphuric acid so much hydrochloric acid in any desired form that the hydrochloric acid corresponds to approximately 50 parts of hydrochloric acid of 20° Bé.

4. A method as claimed in claim 1, in which the reaction mixture obtained by the said treatment with sulphuric acid is separated from the liquid phase, and the residue then subjected to the further treatment.

5. The method of activating crude earth, which consists in slurrying unbaked crude earth with water to form a sludge weighing substantially 1.2–1.4 kilograms per liter, adding further water to establish a concentration favorable for activation, adding, while stirring, so much cold dilute sulphuric acid, and, likewise while stirring, heating to a temperature of at the most 200° C., that as nearly as possible the whole of the decomposable calcium is converted into gypsum, treating with hydrochloric acid in any desired form, at the latest after termination of the said sulphuric acid treatment and then water washing, so that the whole of the gypsum present, comprising that present from the outset in the starting materials and that evolved in the course of the said sulphuric acid treatment, is dissolved and retained in solution during this subsequent washing step.

6. The method of activating crude earth, which consists in slurrying with water a quantity of crude earth corresponding to 100 parts of dry matter to form a sludge weighing substantially 1.2–1.4 kilograms per liter, adding approximately 150 parts of water to establish a concentration favorable for activation, bringing the said sludge, while stirring, into contact with approximately 73 parts of 78% sulphuric acid and approximately 45 parts of sodium chloride, and heating the resulting mixture to vigorous boiling.

RICHARD DOHT.